(12) United States Patent
Tamilarasan et al.

(10) Patent No.: US 7,861,123 B1
(45) Date of Patent: Dec. 28, 2010

(54) MANAGING LOOP INTERFACE FAILURE

(75) Inventors: Ashok Tamilarasan, Framingham, MA (US); Michael Manning, Hopkinton, MA (US); Naizhong Qiu, Wayland, MA (US)

(73) Assignee: EMC Corporation, Hopkinton, MA (US)

( * ) Notice: Subject to any disclaimer, the term of this patent is extended or adjusted under 35 U.S.C. 154(b) by 444 days.

(21) Appl. No.: 12/004,311

(22) Filed: Dec. 20, 2007

(51) Int. Cl.
*G06F 11/00* (2006.01)

(52) U.S. Cl. .................................................... 714/43

(58) Field of Classification Search .............. 714/2–8, 714/25–27, 31, 32, 37, 42, 43, 48, 54
See application file for complete search history.

(56) References Cited

U.S. PATENT DOCUMENTS

| 6,678,839 | B2 * | 1/2004 | Mori ............................. 714/44 |
| 7,036,042 | B1 * | 4/2006 | Nguyen ........................... 714/7 |
| 7,051,252 | B2 * | 5/2006 | Smith et al. ................... 714/715 |
| 7,302,615 | B2 * | 11/2007 | Sakai ............................ 714/43 |
| 2003/0103462 | A1 * | 6/2003 | Smith .......................... 370/241 |
| 2006/0224734 | A1 * | 10/2006 | Aono ........................... 709/224 |

* cited by examiner

*Primary Examiner*—Nadeem Iqbal
(74) *Attorney, Agent, or Firm*—Krishnendu Gupta; Jason A. Reyes; Phillip W. Citroen

(57) ABSTRACT

Loop interface failure is managed. A first device on a loop is identified as a potential cause of the loop interface failure. The loop is tested with the first device functionally removed from the loop. Depending on the results of the test, it is determined that the first device is not the cause of the loop interface failure and a second device on the loop is identified as the cause of the loop interface failure.

13 Claims, 6 Drawing Sheets

MANAGING LOOP INTERFACE FAILURE

FIELD OF THE INVENTION

The present invention relates generally to managing loop interface failure.

BACKGROUND OF THE INVENTION

Computers, computer networks, and other computer-based systems are becoming increasingly important as part of the infrastructure of everyday life. Networks are used for sharing peripherals and files. In such systems, complex components are the most common sources of failure or instability. The proliferation of multiple interacting components leads to problems that are difficult or impossible to predict or prevent. The problems are compounded by the use of networks, which introduce the added complexity of multiple machines interacting in obscure and unforeseen ways.

Most complex electronic devices, including computer systems and networked hardware, are designed with built-in diagnostics. These diagnostics are specifically designed for the system and usually detect a fairly wide range of problems. Sometimes they can also implement fixes or workarounds, or at least pinpoint a problem to speed its repair.

The use of interconnected components, although advantageous for performance and expandability, increases the risk of an error propagating through the system and causing widespread harm in the system.

For example, Fibre Channel ("FC") is a high performance, serial interconnect standard for bi-directional, point-to-point communications between servers, storage systems, workstations, switches, and hubs. Fibre Channel standards are described by the Fibre Channel Industry Association (FCIA) (http://www.fibrechannel.org). FC supports a variety of upper-level protocols, including the small computer systems interface ("SCSI") protocol. A device is linked to the network through an FC port and copper wires or optical fibres. An FC port includes a transceiver and an interface controller, which conducts lower-level protocol exchanges between the FC channel and the device in which the FC port resides.

Because of the high bandwidth and flexible connectivity provided by FC, FC is a common medium for interconnecting devices within multi-peripheral-device enclosures, such as redundant arrays of inexpensive disks ("RAIDs"), and for connecting multi-peripheral-device enclosures with one or more host computers. These multi-peripheral-device enclosures economically provide greatly increased storage capacities and built-in redundancy that facilitates mirroring and fail over strategies needed in high-availability systems. Although FC is well-suited for this application with regard to capacity and connectivity, FC is a serial communications medium. Malfunctioning peripheral devices and enclosures can, in certain cases, degrade or disable communications. FC-based multi-peripheral-device enclosures are expected to isolate and recover from malfunctioning peripheral devices.

In particular, an FC interface which connects devices in a loop such as a Fibre Channel Arbitrated Loop (FC-AL) is widely used in disk array apparatuses and the like, since it has a simple connecting configuration of cables and can easily accommodate device extensions. In this type of interface, when signals cannot propagate in the loop because of failures or the like in interface circuits of connected devices (this is called, for example, loop abnormality or link down), the whole loop cannot be used. That is, even though a failure occurs in only one device, all devices connected to the loop cannot be used. Thus, disk array apparatuses usually have interface circuits for two ports, so that these devices are connected to two independent loops. With this configuration, even when one loop of the dual loop interfaces is out of use because of a failure or the like, accesses can be performed using the other loop, to thereby improve reliability.

SUMMARY OF THE INVENTION

Loop interface failure is managed. A first device on a loop is identified as a potential cause of the loop interface failure. The loop is tested with the first device functionally removed from the loop. Depending on the results of the test, it is determined that the first device is not the cause of the loop interface failure and a second device on the loop is identified as the cause of the loop interface failure.

One or more implementations of the invention may provide one or more of the following advantages.

A bad device can be correctly identified and kept off a Fibre Channel Arbitrated Loop, in order to maintain accessibility to other devices on the same Loop. In a data storage system, a drive with a bad transmitter can be correctly identified and put in bypass mode, helping to prevent a data unavailability/data loss scenario.

Other advantages and features will become apparent from the following description, including the drawings, and from the claims.

DETAILED DESCRIPTION

Described below is a technique for use in managing loop interface failure, particularly for use in identifying a drive with a bad transmitter. On a loop interface, if a drive has a bad transmitter, the drive can disable an entire data storage enclosure and/or drives after the bad drive. As described below, use of the technique helps identify the drive with the bad transmitter and therefore improves the chances of keeping other drives and other components available on the loop. In accordance with the technique, after a loop interface failure, all the drives on the loop are removed from the loop and one drive is added at a time in order to the loop. If adding a drive causes the loop to start to fail again, the previous drive on the loop may be put in bypass mode as described below. If the loop is operable after such previous drive is put in bypass mode, it is determined that the drive with a bad transmitter has been correctly identified, and that drive is kept in bypass mode. The rest of the drives can then be added to the loop, and this helps prevent a data unavailability/data loss scenario.

Previously, when it was suspected that a drive was bad such that the entire loop was disabled, all the drives on the loop were removed from the loop and one drive was added at a time to the loop as described above, but subsequent steps only handled the case of a drive with a bad receiver, not a bad transmitter. Therefore, previously, the drive with the bad transmitter was added successfully, but the loop would fail when the subsequent drive was added to the loop, and it would be determined that the subsequent drive had a bad receiver and thus needed to be put in bypass mode. Accordingly, previously, the subsequent (good) drive was put in bypass mode, and the next drive was added, but adding that drive would also result in loop failure, causing that next drive also to be put in bypass mode. In this way, previously, all drives after the drive with the bad transmitter would be put in bypass mode but the actual bad-transmitter drive itself would not be put in bypass mode.

Therefore, use of the technique helps cause the actual drive with the bad transmitter to be put in bypass mode rather than the good drives, thus helping to prevent a data unavailability/data loss scenario.

Figure 1:
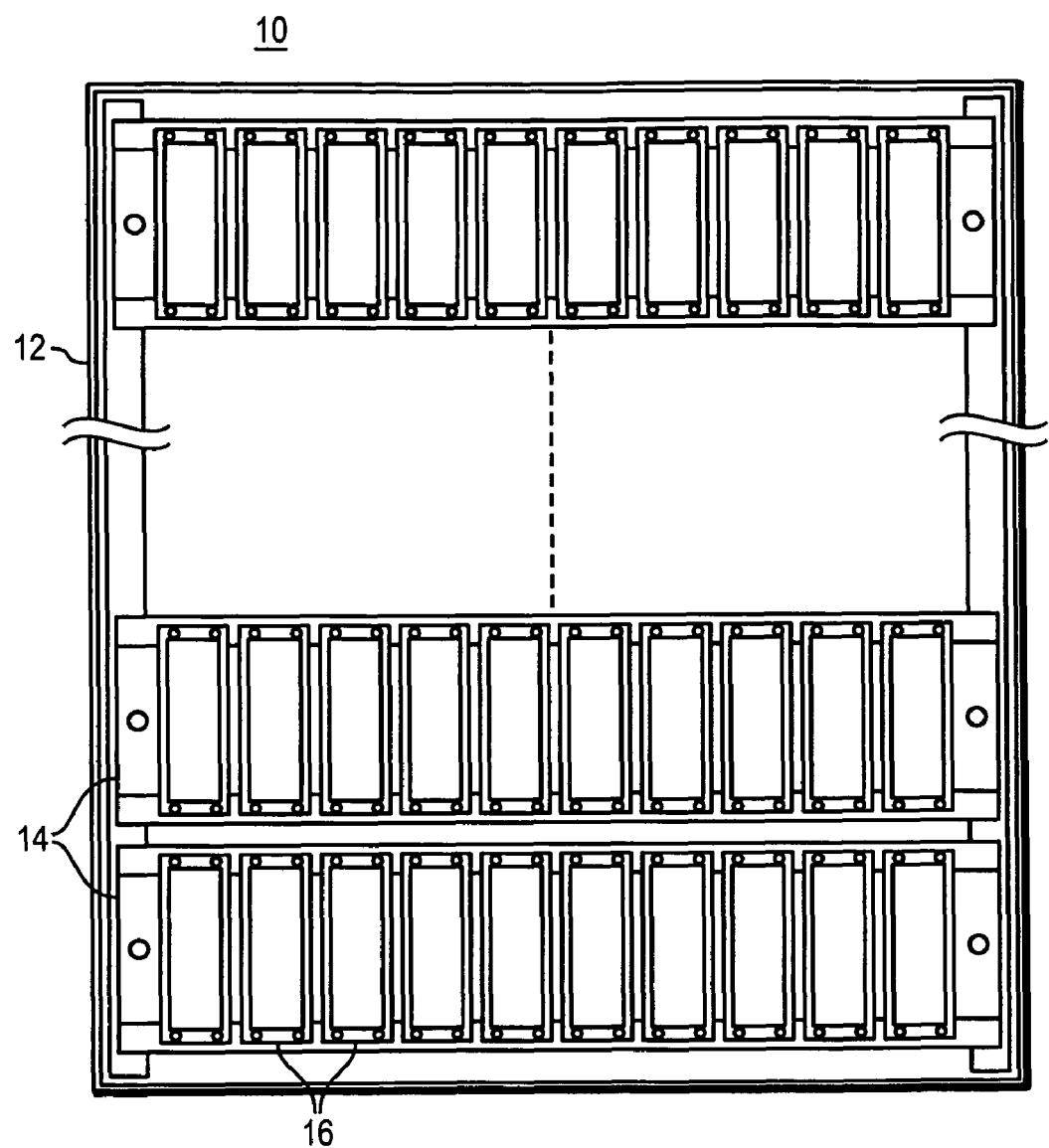
FIG. 1 is a representation of a rack mount system including several storage enclosures.
Figure 2:
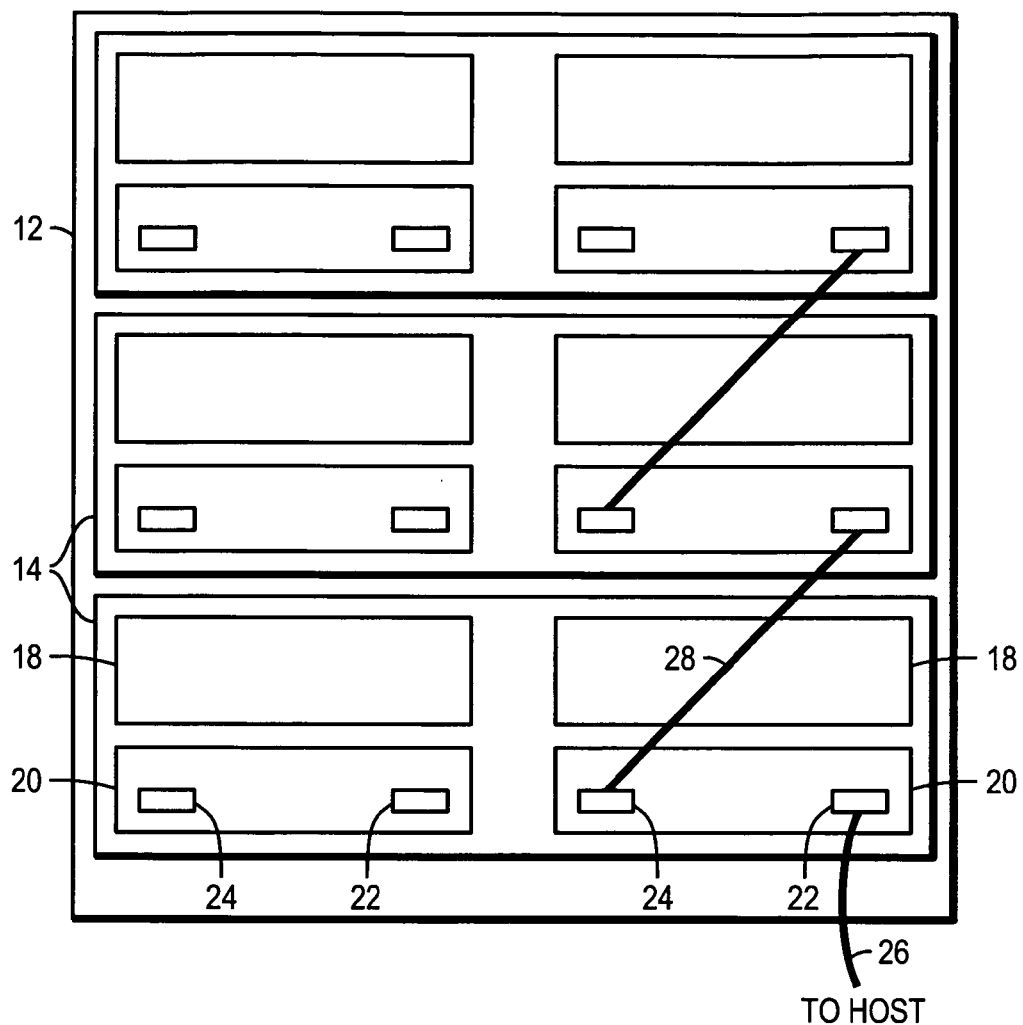
FIG. 2 is a rear view of the rack mount system and storage enclosures of FIG. 1.

Referring to FIG. 1 of the present application, there is shown an example of a storage system 10 in which the present invention may be employed. A rack mount cabinet 12 includes several storage enclosures 14. Each storage enclosure 14 includes several disk drives 16. The disk drives and the enclosures are preferably interconnected via a serial bus loop or ring architecture, e.g., Fibre Channel Arbitrated Loop (FC-AL). In FIG. 2 there is shown a rear view of the rack mount cabinet 12 and the storage enclosure 14. Each storage enclosure includes two power supplies 18, and two link control cards ("LCCs") 20. The power supplies 18 and link control cards 20 are coupled to the disk drives 16 via a midplane within the chassis (not shown in FIG. 2). The link control card 20 serves to interconnect the disks and enclosures on the FC-AL.

Each link control card 20 includes a primary port 22 and an expansion port 24. These ports are used to link the storage enclosures together on a single FC-AL. A cable 26 may come from a host or from another storage system, and plugs into the primary port 22. The FC-AL extends from the primary port 22, is coupled to the disk drives 16, and continues out the expansion port 24. A cable 28 couples the expansion port 24 of a first storage enclosure 14 to the primary port 22 of a second storage enclosure 14. All the storage enclosures 14 are interconnected in this manner in a daisy chain to form the FC-AL. Thus, all the disk drives 16 are interconnected on the same FC-AL.

Each link control card 20 is capable of controlling all the disks 16 in a given enclosure.

Figure 3:
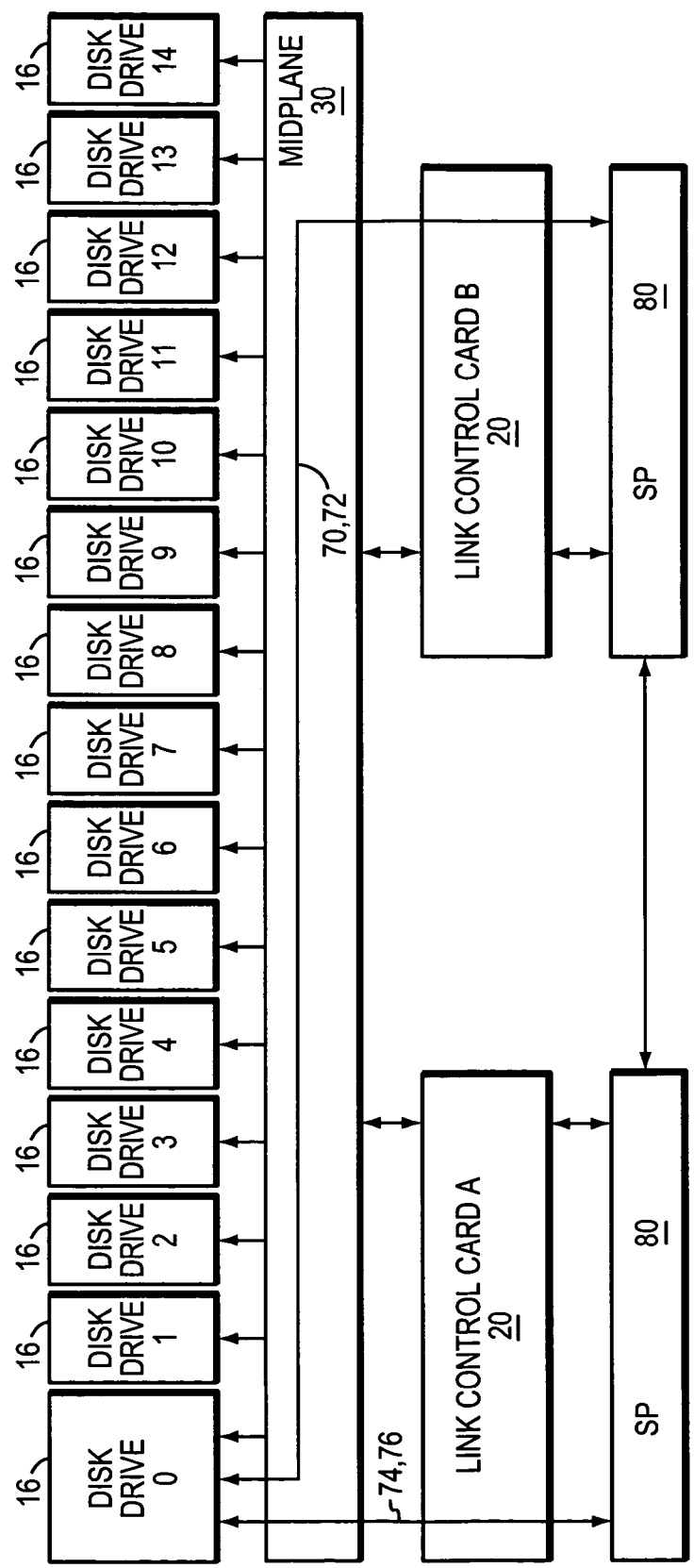
FIGS. 3-4 are block diagrams of components of the rack mount system and storage enclosures of FIG. 1.

FIG. 3 illustrates communication among drives 16, midplane 30, LCCA and LCCB 20, and storage processors (SP) 80. In at least some embodiments, storage processors 80 are controllers within the storage system that control the storage system's access to the storage enclosure, and are configured to communicate with each of drives 16 (exemplified by drive 0 in FIG. 3) over respective Fibre Channel links (loops) 74, 70, and over respective diplexing links 76, 72 as described in U.S. Pat. No. 5,901,151 to Bleiweiss, et al. entitled "System for orthogonal signal multiplexing", which is hereby incorporated herein by reference in its entirety.

The system may include a diagnostic section (which may be included within the SPs) which regularly polls the enclosures at a rate of typically 500 milliseconds, and can communicate with an enclosure not yet added to the FC-AL, e.g., by using the diplexing links. In a particular example, such communication could use a diplexed signal which is a transmission comprising two distinct signals that have been modulated together and transmitted over a single transmission wire. The signals are generally transmitted at frequencies and may also be transmitted at different voltage levels. One example of a diplexed signal is the piggybacking of an RS232 protocol signal over Fibre Channel protocol signal lines, which may be done in storage area networked environments. The RS232 protocol is a standard for serial transmission of data between two devices, normally carrying between ±5V and ±12V on both data and control signal lines. The Fibre Channel signals generally have a lower voltage. The diplexed signals are typically separated at their destinations by a filter device into the RS232 and Fibre Channel signals, and forwarded as appropriate.

Figure 4:
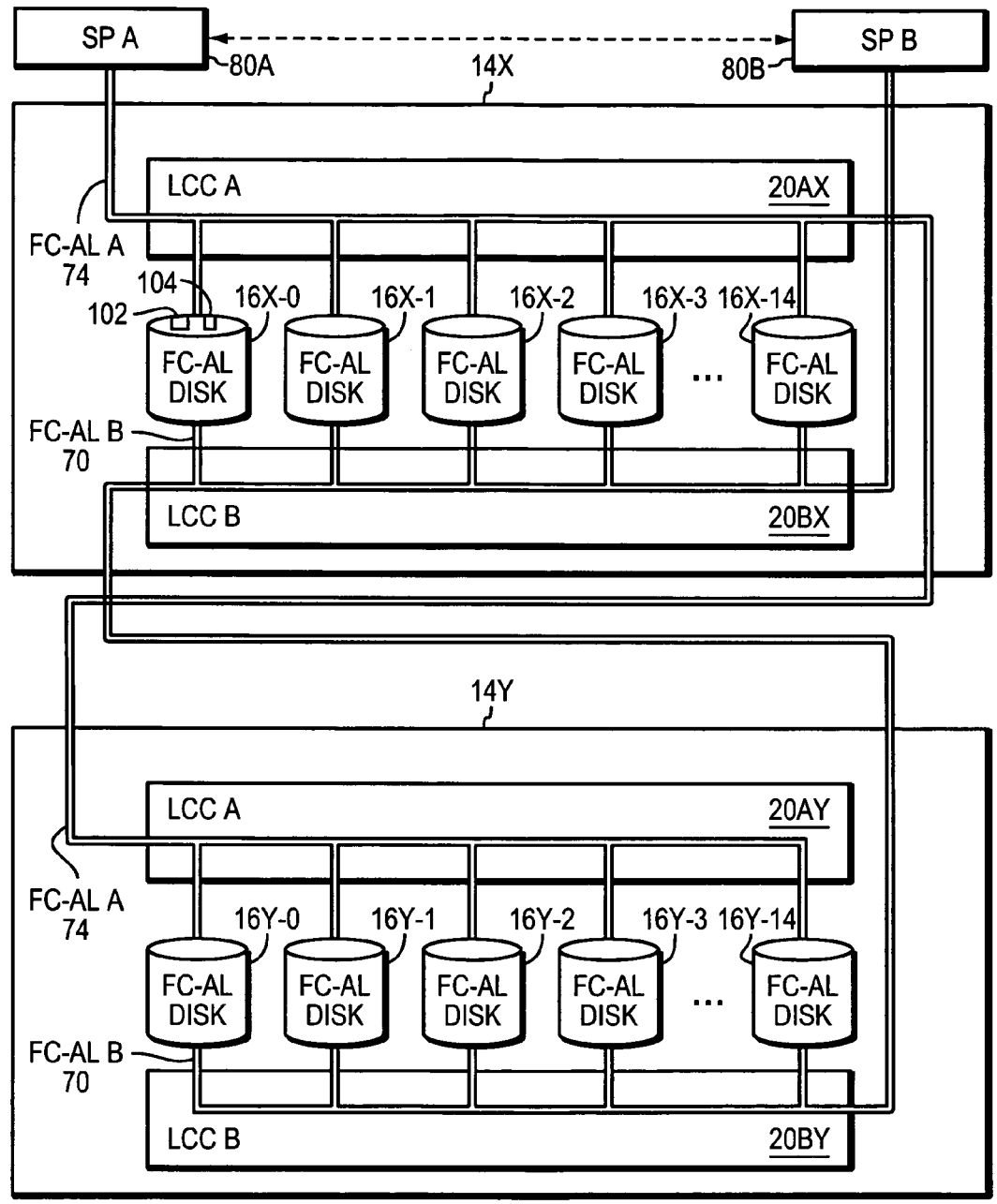

FIG. 4 illustrates an example implementation of system 10 having enclosures 14 (specifically 14X, 14Y) in communication with SPs 80 (specifically 80A, 80B) using FC-AL loops 74, 70. (Mechanically, SPs 80A, 80B may or may not be included in one of enclosures 14X, 14Y.) Enclosure 14X has LCCs 20AX, 20BX and disks 16X-0 through 16X-14, and enclosure 14Y has LCCs 20AY, 20BY and disks 16Y-0 through 16Y-14. Loop 74 allows SP 80A to communicate with disks 16X-0 through 16X-14 via LCC 20AX, and with disks 16Y-0 through 16Y-14 via LCC 20AY. Loop 70 allows SP 80B to communicate with disks 16X-0 through 16X-14 via LCC 20BX, and with disks 16Y-0 through 16Y-14 via LCC 20BY.

Each of disks 16X-0 through 16X-14 and 16Y-0 through 16Y-14 has a FC receiver and a FC transmitter for each loop connection. For example, disk 16X-0 has receiver 102 and transmitter 104. Thus, a communication directed from SP 80A to disk 16Y-14 is first received at disk 16X-0 by receiver 102 and is transmitted by transmitter 104 to disk 16X-1, which in turn passes the communication along to disk 16X-2, and so on. The communication passes between enclosures when disk 16X-14 passes it to disk 16Y-0, which in turn passes it to disk 16Y-1, and so on. Ultimately the communication reaches its destination, disk 16Y-14. As shown in FIG. 4, a communication directed from disk 16Y-14 to SP 80A travels directly to SP 80A since there are no disks between disk 16Y-14 and SP 80A in that direction on the loop.

With respect to each loop, one or more disks or enclosures may be set, e.g., using the diplex signals, to a bypass mode such that FC signals travel along the loop as if the disks or enclosures were not on the loop. For example, if enclosure 14Y is set to bypass mode, a communication directed from disk 16X-14 to SP 80A travels directly to SP 80A since there are no disks between disk 16X-14 and SP 80A in that direction on the loop when enclosure 14Y is not on the loop. In another example, if disk 16X-2 is set to bypass mode, a communication directed from SP 80A to disk 16X-4 passes directly from disk 16X-1 to disk 16X-3 on its way to disk 16X-4.

Bypass mode only affects FC signals, not diplex signals.

A characteristic of an FC loop is that if any device, e.g., LCC, drive, or cable, on the loop has a problem passing communications along the loop, it is possible for the problem to disable the entire loop (i.e., cause the entire loop to fail) so that none of the devices on the loop is discoverable or can receive or transmit FC communications, i.e., the loop ends up completely broken.

Diplex signaling works largely independently of FC communications, such that devices may still be discoverable via diplex signaling even if the FC loop is broken. For example, with respect to the system of FIG. 4, if the FC loop is working, the same number of disks, i.e., 30 disks, should be discovered both by diplex signal discovery and by FC discovery. In another example with respect to FIG. 4, if the FC loop is working but enclosure 14Y is set to bypass mode, diplex signal discovery should still discover 30 disks but FC discovery will discover only 15 disks (the disks of enclosure 14X). Similarly with respect to FIG. 4, if the FC loop is working and only disk 16X-2 is set to bypass mode, diplex signal discovery should still discover 30 disks but FC discovery will discover only 29 disks.

If a device (e.g., drive) on the loop has a problem with its transmitter or receiver, this problem may prevent the device from passing communications along the loop and therefore may disable the entire loop unless the device is bypassed. If the entire loop is disabled due to this problem, FC discovery will fail completely, and therefore its results will not match the results of diplex signal discovery.

When a problem exists that causes the entire loop to be disabled, technique including a trial and error process is to be used to help identify the device having the problem, so that the device can be put in bypass mode to prevent the problem from disabling the entire loop. If a device has a bad receiver, the loop will become disabled when the device is added. If a device has a bad transmitter, the loop will become disabled when the next device is added.

Figure 5A:
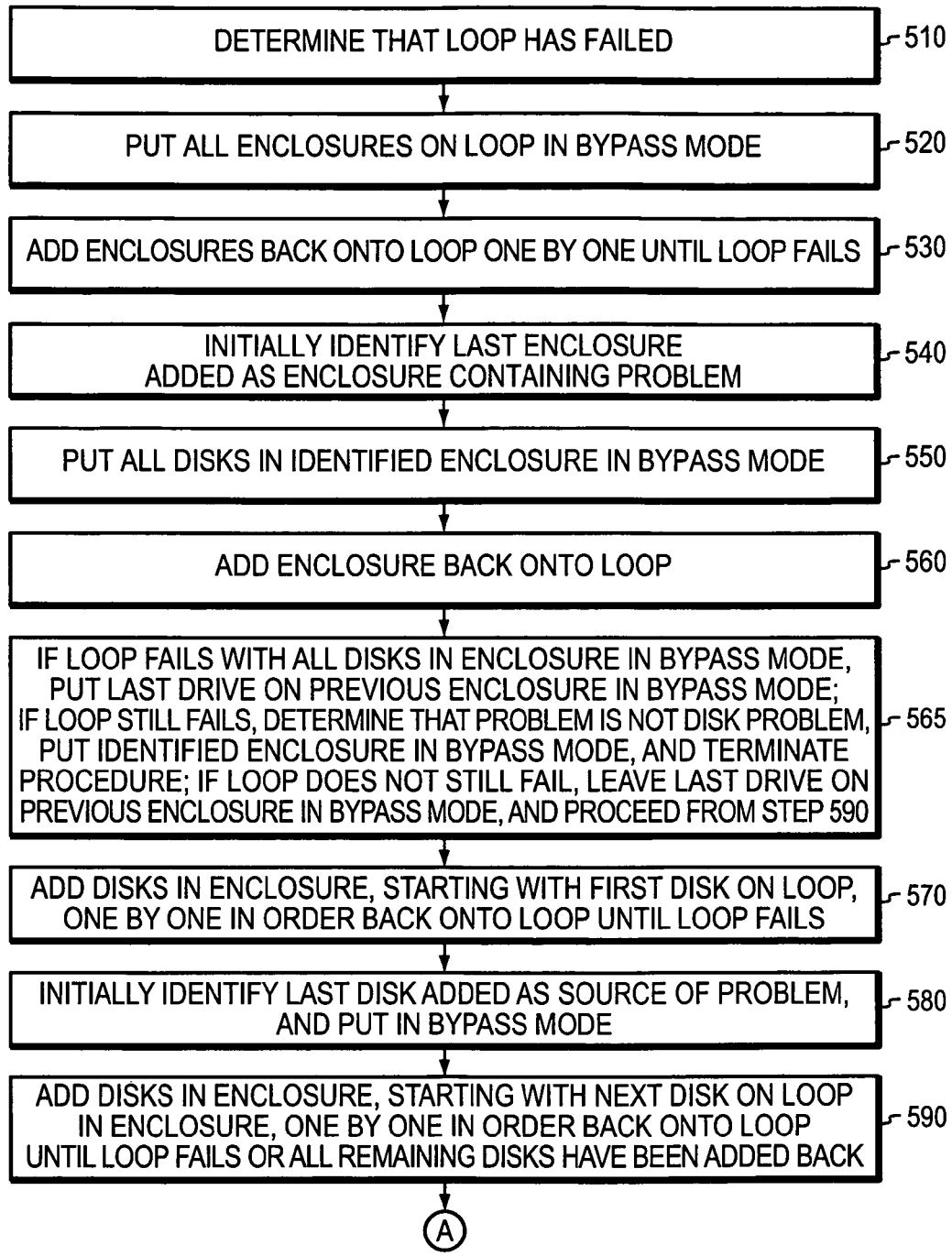
FIG. 5 is a flowchart of a procedure that may be used with the rack mount system of FIG. 1.
Figure 5B:
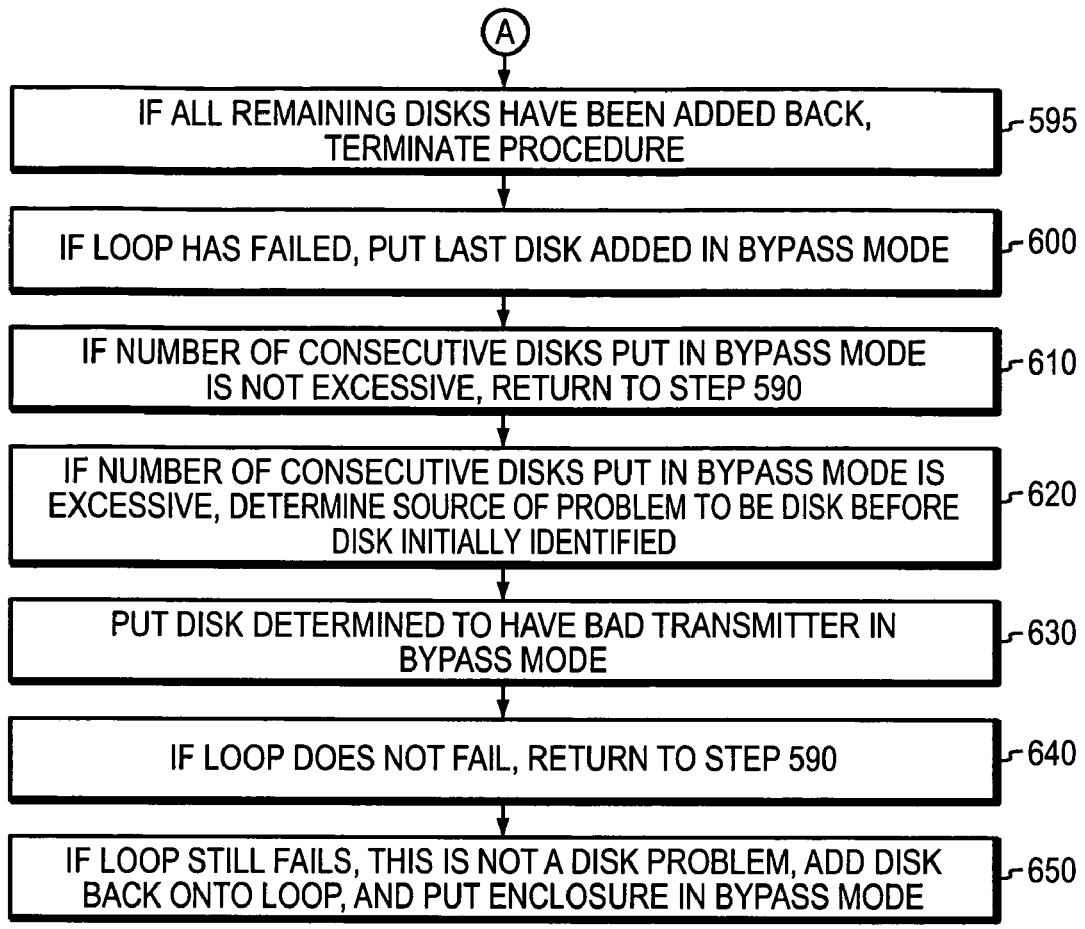

FIG. 5 illustrates a procedure which is an example implementation of the technique.

It is determined that the loop has failed (step 510).

All enclosures on the loop are put in bypass mode (step 520).

Enclosures are added back onto the loop one by one until the loop fails (step 530). (A device is added back by changing it out of bypass mode.)

The last enclosure added is initially identified as the enclosure containing the problem (step 540).

All disks in the identified enclosure are put in bypass mode (step 550). The enclosure is added back onto the loop (step 560).

If the loop fails with all the disks in the enclosure in bypass mode, the last drive on the previous enclosure is put in bypass mode; if the loop still fails, it is determined that the problem is not a disk problem (e.g., is a cable or an LCC problem), the identified enclosure is put in bypass mode, and the procedure terminates; if the loop does not still fail, the last drive on the previous enclosure is left in bypass mode, and the procedure proceeds from step 590 (step 565).

Disks in the enclosure, starting with the first disk on the loop in the enclosure, are added one by one in order back onto the loop until the loop fails (step 570).

The last disk added is initially identified as the source of the problem, and is put in bypass mode (step 580). This is because the last disk added is initially identified as having a bad receiver.

Disks in the enclosure, starting with the next disk on the loop in the enclosure, are added one by one in order back onto the loop until the loop fails or all remaining disks have been added back (step 590).

If all remaining disks have been added back, the procedure terminates (step 595).

If the loop has failed, the last disk added is put in bypass mode (step 600).

If the number of consecutive disks put in bypass mode is not excessive (e.g., is not more than 3), the procedure returns to step 590 (step 610).

If the number of consecutive disks put in bypass mode is excessive, the source of the problem is determined to be the disk before the disk initially identified (step 620). This is because it is determined that the problem is not bad receivers on all the consecutive disks; rather, a bad transmitter on such earlier disk which prevents such earlier disk from properly communicating with any subsequent disk on the loop. Thus, the last known good disk is determined to be the disk before the disk determined to have a bad transmitter.

The disk determined to have a bad transmitter is put in bypass mode (step 630). This applies even if the disk determined to have a bad transmitter is in another (previous) enclosure. In such a case, unless this disk truly having a bad transmitter is put in bypass mode, no enclosures can be added after this disk on the loop, and the inability to add such enclosures can cause data unavailability and/or data loss.

If the loop does not fail, the procedure returns to step 590 (step 640).

If the loop still fails, it is determined that this is not a disk problem, the disk determined to have a bad transmitter is probably not bad after all, so the disk is added back onto the loop, and the enclosure is put in bypass mode (step 650).

Thus, for example, with reference to FIG. 4, if loop 74 fails, the procedure may proceed as follows. Enclosures 14X, 14Y are put in bypass mode. Enclosure 14X is added with all its disks in bypass mode. All of the disks of enclosure 14X are added back one by one onto the loop, without the loop failing. Thus it is determined that the problem is not in enclosure 14X. Enclosure 14Y is added with all its disks in bypass mode. The disks of enclosure 14Y are added back one by one onto the loop until the loop fails when disk 16Y-2 is added. Disk 16Y-2 is put in bypass mode. All of the remaining disks of enclosure 14Y are added back one by one onto the loop without the loop failing. Thus, in this example, the problem was with the receiver of disk 16Y-2.

A variation of this example is the same up to the point when disk 16Y-2 is put in bypass mode, but differs thereafter. When disk 16Y-3 is added back onto the loop, the loop fails again. Disk 16Y-3 is put in bypass mode. When disk 16Y-4 is added back onto the loop, the loop fails again. Disk 16Y-4 is put in bypass mode. When disk 16Y-5 is added back onto the loop, the loop fails again. Disk 16Y-5 is put in bypass mode. Thus it is determined that disk 16Y-1 has a bad transmitter, and that the last good disk is disk 16Y-0. Disk 16Y-1 is put in bypass mode. All of the remaining disks of enclosure 14Y are added back one by one onto the loop without the loop failing.

In at least some implementations, the technique may be executed in software running on an operating system of system 10 which provides a mechanism for invoking diplex signals to cause drives and enclosures in bypass mode. In at least one implementation of system 10, to cause a drive to be put in bypass mode, a diplex command is issued causing a register on an LCC to be written to, which closes a corresponding port to the drive so that the FC signal does not reach the drive.

Other embodiments are within the scope of the following claims. For example, the technique may be used for non-FC types of loop architectures.

What is claimed is:

1. A method for use in managing loop interface failure, the method comprising:
functionally adding a first device to an operable loop of devices, wherein a loop interface failure occurs when the first device is functionally added to the loop;
executing a procedure in response to the loop interface failure to identify a bad device that is causing the loop interface failure, wherein the procedure comprises avoiding removing the devices of the operable loop of devices that existed prior to the functionally adding of the first device on the loop; and
based on results of the procedure, determining that the first device is not the cause of the loop interface failure and identifying a device of the operable loop of devices as the bad device, wherein the identified device is one of the devices of the operable loop of devices that existed prior to the functionally adding of the first device.

2. The method of claim 1, wherein:
the identified device has a bad transmitter.

3. The method of claim 1, wherein executing a procedure includes:
  functionally removing drives from the loop; and
  adding one drive at a time in order to the loop.

4. The method of claim 3, further comprising:
  if adding a drive causes the loop to start to fail, putting the previous drive on the loop in bypass mode.

5. The method of claim 4, further comprising:
  if the loop is operable after a drive is put in bypass mode, determining that a drive with a bad transmitter has been correctly identified.

6. The method of claim 3, further comprising:
  using diplex signals to functionally remove a disk from the loop.

7. The method of claim 1, wherein, if the first device has a bad receiver, the loop becomes disabled when the first device is added.

8. The method of claim 1, wherein, if the first device has a bad transmitter, the loop becomes disabled when the next device is added.

9. The method of claim 4, further comprising:
  determining whether the number of devices put in bypass mode is excessive.

10. The method of claim 5, further comprising:
  determining that the last known good device is a device before the device determined to have a bad transmitter.

11. The method of claim 5, further comprising:
  determining that the device determined to have a bad transmitter is a device in a previous enclosure.

12. The method of claim 1, further comprising:
  determining that no enclosures can be added after the first device on the loop.

13. A method for use in managing loop interface failure, the method comprising:
  determining that the loop has failed;
  putting all enclosures on the loop in bypass mode;
  adding enclosures back onto the loop one by one until the loop fails;
  initially identifying the last enclosure added as the enclosure containing a problem;
  putting all disks in the identified enclosure in bypass mode;
  adding the identified enclosure back onto the loop;
  if the loop fails with all the disks in the identified enclosure in bypass mode, putting the last drive on the previous enclosure in bypass mode;
  if the loop still fails, determining that the problem is not a disk problem, and putting the identified enclosure in bypass mode;
  if the loop does not still fail, leaving the last drive on the previous enclosure in bypass mode;
  adding disks in the enclosure, starting with the first disk on the loop in the enclosure, one by one in order back onto the loop until the loop fails;
  initially identifying the last disk added as the source of the problem;
  putting the last disk added in bypass mode;
  adding disks in the enclosure, starting with the next disk on the loop in the enclosure, one by one in order back onto the loop until the loop fails or all remaining disks have been added back;
  if the loop has failed, putting the last disk added in bypass mode;
  if the number of consecutive disks put in bypass mode is excessive, determining the source of the problem to be the disk before the disk initially identified;
  putting the disk determining the source of the problem in bypass mode; and
  if the loop still fails, adding the disk back onto the loop, and putting the enclosure in bypass mode.

* * * * *